US006669769B2

(12) United States Patent
Smith

(10) Patent No.: US 6,669,769 B2
(45) Date of Patent: Dec. 30, 2003

(54) FLEXOGRAPHIC INK COMPOSITION CONTAINING HYDROLYZED GELATIN AS A BINDER RESIN

(75) Inventor: Doreen E. Smith, Belleville, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 64 days.

(21) Appl. No.: 10/034,003

(22) Filed: Dec. 28, 2001

(65) Prior Publication Data

US 2003/0136302 A1 Jul. 24, 2003

(51) Int. Cl.7 ............................................... C09D 11/02
(52) U.S. Cl. .................. 106/31.83; 106/31.75
(58) Field of Search ............................ 106/31.83, 31.75

(56) References Cited

U.S. PATENT DOCUMENTS

| 1,725,649 | A | * | 8/1929 | Knight ..................... 106/31.26 |
| 4,648,905 | A | | 3/1987 | Peck et al. ..................... 106/24 |
| 4,686,260 | A | | 8/1987 | Lindemann et al. ........ 524/458 |
| 4,770,706 | A | | 9/1988 | Pietsch ......................... 106/24 |
| 5,529,767 | A | | 6/1996 | Brox et al. ................. 424/10.2 |
| 6,197,482 | B1 | * | 3/2001 | Lobo et al. .................. 430/350 |

FOREIGN PATENT DOCUMENTS

| EP | 0523567 A1 | 7/1992 | ........... C09D/11/02 |
| EP | 0523567 A1 | 1/1993 | ........... C09D/11/02 |
| HU | 47626 | 3/1987 | ........... C09D/11/04 |
| JP | 61243871 | 10/1986 | ........... C09D/11/02 |
| JP | 2067376 | 3/1990 | ........... C09D/11/02 |
| JP | 4-325577 | 11/1992 | ........... C09D/11/18 |
| JP | 5170960 | 7/1993 | |
| JP | 6049405 | 2/1994 | ........... C09D/11/18 |
| JP | 673324 | 3/1994 | ........... C09D/11/18 |
| JP | 9217036 | 8/1997 | ........... C09D/11/02 |
| WO | WO 96/14357 A1 | 5/1996 | ........... C08L/1/04 |
| WO | WO 0162860 | 8/2001 | ........... C09D/11/00 |

OTHER PUBLICATIONS

Viscosity conversion chart from Cork Industries, no date available.*
Sirost, Jean–Claude, Ink: Its Vehicle, Caractere No 225, Dec. 1987, pp. 56–61.
Sen, Gautam; Resins for Water–Based Inks, Color Development/Grinding; American Ink Maker, Dec. 1987; pp 3738, 40, and 180.
Vanderhoff, John W.; Water–Based Printing Inks, Third International Conference in Organic Coatings Science and Technology Proceedings, vol. 1–Advances in Organic Coatings Science and Technology Series; pp 235–243, Jul. 1977.

* cited by examiner

Primary Examiner—Helene Klemanski
(74) Attorney, Agent, or Firm—Sidney Persley

(57) ABSTRACT

A flexographic preprint ink composition, which includes at least 3 weight percent of a pigment; at least 15 weight percent of a hydrolyzed gelatin; and water. The ink composition may also contain conventional additives, such as surfactants and defoaming agents, typically found in flexographic ink compositions. The flexographic ink composition can exhibit better heat resistance, mileage, strength, wet trap, foam resistance, drying, stability, and plate transfer than conventional flexographic inks which contain soy as a binder.

14 Claims, No Drawings

FLEXOGRAPHIC INK COMPOSITION CONTAINING HYDROLYZED GELATIN AS A BINDER RESIN

BACKGROUND OF THE INVENTION

1. Field of the Invention

This invention relates to flexographic ink compositions. More specifically, the invention relates to a flexographic ink which contains hydrolyzed gelatin as a binder resin and which has particular utility as a preprint ink for paper packaging.

2. Description of the Prior Art

A flexographic printing ink will generally contain a pigment and a binder resin dispersed in water. The binder serves as a carrier for the pigment and affixes the pigment to the surface to be printed. A wide variety of binder systems have been used for flexographic ink compositions, including acrylic and methacrylic polymers and copolymers, rosin modified phenolic resins, polystyrene resins and soy protein.

Flexographic printing inks may be used as preprint inks for corrugated paper packaging materials. The ink is printed upon one side of a paper liner, which is then glued to a series of flutes and then glued to a second paper liner. The preprint ink must be able to withstand the heat and pressure of corrugation, and should preferably display acceptable printing properties such as mileage, strength, wet trap, foam resistance, drying, gloss, plate transfer and water resistance.

"Gelatin" is a mixture of proteins obtained by hydrolysis of collagen by boiling skin, ligaments, tendons, etc. from various sources such as fish, pig and cow. Its production differs from that of animal glue in that the raw materials are selected, cleaned and treated with special care so that the product is cleaner and purer than glue.

It is known to add hydrolyzed gelatin in minor amounts to ink compositions generally. U.S. Pat. No. 4,770,706 discloses the enzymatic hydrolysis of gelatin for use as a dispersion stabilizer in aqueous inks. Japanese Published Patent Application No. 60-49405 discloses gelatin as one of several possible viscosity control agents in a ball point ink composition containing a fluorescent dye.

Hungarian Patent Publication 47626 discloses a flexographic binder composition which contains 2–4.5 percent by weight "hydrolyzed casein or hydrolyzed glue" in combination with polyacrylic or polyvinyl polymers having carboxylic and nitrile groups, and a partial alkali metallic and/or ammonia salt of a water-soluble acrylic polymer or vinyl polymer.

Japanese Patent Publication No. 4-325577 discloses a black pigment aqueous ink composition which can include gelatine as a viscosity controlling agent.

European Patent Publication No. 523567 discloses a flexographic, water dilutable bronze or effect printing ink composition which contains 30–45 weight percent of bronze, aluminum and/or a pearlescent pigment and 55–70 weight percent of a second component which includes 80–100% of a vehicle system and 0–20 weight percent of a wax. The vehicle system contains from 60 to 100 weight percent styrene and/or an acrylate dispersion, 0 to 15 weight percent cellulose and/or collagen and/or polyethylene glycol, and 0 to 15 weight percent of one or more glycols.

An object of the present invention is to provide a flexographic ink composition having a superior combination of desirable properties in comparison to conventional flexographic ink compositions.

A feature of the present invention is the presence of at least 15 weight percent hydrolyzed gelatin in an otherwise conventional flexographic ink composition.

An advantage of the present invention is that it can provide a flexographic ink composition which exhibits better heat resistance, mileage, strength, wet trap, foam resistance, drying, stability, and plate transfer than conventional flexographic inks which contain soy as a binder.

SUMMARY OF THE INVENTION

The present invention relates to a flexographic preprint ink composition, comprising:
a. at least 3 weight percent of a pigment;
b. at least 15 weight percent of a hydrolyzed gelatin; and
c. water.

DETAILED DESCRIPTION OF THE PREFERRED EMBODIMENTS

The inventor has unexpectedly discovered that it is possible to replace conventional pigment binders (soy and water-soluble polymers such as acrylic and methacrylic polymers and copolymers) with hydrolyzed gelatin in an otherwise conventional flexographic preprint ink composition.

Any pigment suitable for use in a conventional flexographic preprint ink composition is suitable for use in the composition of the present invention. Illustrative pigments include diarylide yellow, orange, napthol red, lithol rubine, phthalocyanine green, phthalocyanine blue, barium lithol, calcium lithol, rhodamine, violet, alkali blue, titanium dioxide and carbon black. Preferred pigments include diarylide yellow such as AAOT yellow (Yellow 14), green shade phthalocyanine blue (Blue 15:13), diansidine orange (PO 16), carbon black (Black 7), rubine shade napthol red (Red 238) and lithol rubine (Red 57).

The pigment may be premilled to reduce its particle size to improve its dispersibility and color strength. Milling can be performed in conventional apparatus using conventional techniques well known to those of ordinary skill in the art.

The pigment may be included in an amount of at least 3 percent by weight of the entire ink composition, preferably from 8 to 25 weight percent. An aqueous pigment dispersion is preferably employed for ease of handling.

The ink composition of the present invention should contain at least 15 weight percent hydrolyzed gelatin, preferably 15 to 40 weight percent, based on the total weight of the composition. Hydrolyzed gelatin may be obtained from cow, fish, bone and pig sources, and is available as an aqueous dispersion. The hydrolyzed gelatin preferably has an average molecular weight of from 1500 to 2500, and is obtained from the cow.

The ink composition of the present invention should have a pH of from 9.0 to 10.0, preferably 9.5 to 9.9. A basic compound, such as an amine, may be added to adjust the pH of the composition. Monoethanolamine is a preferred amine.

The ink composition of the present invention may also contain conventional additives, such as surfactants and defoaming agents, typically found in flexographic ink compositions.

The ink composition of the present invention can also contain a glycol such as propylene glycol preferably in an amount of from 6.5 to 13 weight percent and most preferably from 7.4 to 11.05 weight percent. The propylene glycol can be added to adjust the drying speed of the ink composition.

The viscosity of the ink composition, as measured in a No. 3 Signature Zahn cup, should be at least 11 seconds, and preferably ranges from 11 to 25 seconds.

The flexographic ink composition of the present invention may be prepared by first adding an aqueous pigment dispersion to a mixer. Additional water is added after mixing has begun. Hydolyzed gelatin, and any optional additives such as a surfactant, defoamer, glycol and/or toner, are subsequently added to the mixer. Mixing speed should be controlled to avoid entraining air into the composition. Mixing is continued until an appropriate viscosity and pH are achieved. A typical mixing time is 5 minutes. If necessary or desired, additional water may be added to reduce the viscosity of the composition to a print viscosity of from 11 to 25 seconds, as measured in a No. 3 Signature Zahn cup.

The flexographic ink composition of the present invention may be used as a preprint ink for corrugated paper packaging materials using conventional apparatus and techniques well known to those of ordinary skill in the art. The ink may be printed upon one side of a paper liner, which may then be glued to a series of flutes and then glued to a second paper liner during the corrugation process.

An aqueous overprint varnish composition may be applied over the entire surface of the printed paper liner prior to corrugation to optimize its coefficient of friction for optimum processability within and after leaving the corrugator. The overprint varnish can also ensure the flexographic ink possesses sufficient water resistance. A typical overprint varnish composition includes a polymeric binder, a pH control agent, a defoaming agent, a wax and water.

EXAMPLES

The following Examples illustrate the practice and advantages of specific embodiments of the invention. They are not intended to limit the allowable scope of the invention.

Example 1

Preparation of Flexographic Black Ink Compositions

Three black ink compositions were prepared by mixing a carbon black pigment dispersion, deionized water, and a hydrolyzed gelatin binder using conventional mixing apparatus and techniques well known to those of ordinary skill in the art. A control composition was also prepared which used soy protein rather than gelatin as a binder.

The viscosity of the ink compositions was measured using a No. 3 Signature Zahn cup according to ASTM D-4212-93.

| Component | I-1 | I-2 | I-3 | I-4 |
| --- | --- | --- | --- | --- |
| Carbon Black 1 | 48.70 | | | |
| Carbon Black 2 | | 59.30 | 56.00 | 56.30 |
| Gelatin 1 | | | 41.00 | 39.20 |
| Gelatin 2 | | 35.70 | | |
| Soy Protein | 40.00 | | | |
| Defoamer 1 | 1.00 | | | |
| Glycerine | 7.00 | | | |
| Surfactant 1 | 1.00 | | | |
| Surfactant 2 | | 1.00 | 1.00 | 1.00 |
| Water | 2.30 | 4.00 | 2.00 | 3.50 |
| Total | 100.00 | 100.00 | 100.00 | 100.00 |
| pH | 9.6 | 9.7 | 9.6 | 9.5 |
| Viscosity (seconds) | 16 | 16 | 28 | 25 |
| Diluted to Print Viscosity | 13 | 13 | 14 | 14 |

Carbon Black 1 is an aqueous dispersion containing 40 percent by weight carbon black, commercially available from Abco Enterprises under the tradename T-1133A.
Carbon Black 2 is an aqueous dispersion containing 35 percent by weight carbon black, commercially available from Sun Chemical Corporation under the tradename LCD-4115.
Gelatin 1 is an aqueous dispersion containing 55 percent by weight hydrolyzed gelatin having an average molecular weight of about 2000, commercially available from the Milligan & Higgins division of Hudson Industries Corp. under the tradename HydroPro 10.
Gelatin 2 is an aqueous dispersion containing 48 percent by weight hydrolyzed gelatin.
Soy Protein is an aqueous dispersion containing 26 percent by weight soy protein.
Defoamer 1 is a defoaming agent commercially available from Rhone-Poulenc under the tradename Colloid 999.
Surfactant 1 is a non-ionic surfactant commercially available from Air Products under the tradename Surfynol 104H.
Surfactant 2 is a non-ionic surfactant commercially available from Air Products under the tradename Surfynol SE-F.

Example 2

Preparation of Flexographic Yellow Ink Compositions

Three yellow ink compositions were prepared by mixing a yellow pigment dispersion, deionized water and a hydrolyzed gelatin binder using conventional mixing apparatus and techniques well known to those of ordinary skill in the art. A control composition was also prepared which used soy protein rather than gelatin as a binder.

The viscosity of the ink compositions was measured using a No. 3 Signature Zahn cup according to ASTM D-4212-93.

| Component | II-1 | II-2 | II-3 | II-4 |
| --- | --- | --- | --- | --- |
| AAOT Yellow | 45.85 | 45.85 | 45.85 | 45.85 |
| Diansidine Orange | 0.10 | 0.15 | 0.15 | 0.15 |
| Gelatin 1 | | | 47.30 | 39.30 |
| Gelatin 2 | | 34.60 | | |
| Soy Protein | 53.05 | | | |
| Defoamer 1 | 1.00 | | | |
| Defoamer 2 | | 0.10 | 0.10 | 0.10 |
| Water | | 19.30 | 6.60 | 14.60 |
| Total | 100.00 | 100.00 | 100.00 | 100.00 |
| pH | 9.6 | 9.7 | 9.6 | 9.5 |
| Viscosity (seconds) | 16 | 16 | 25 | 21 |
| Diluted to Print Viscosity | 15 | 14 | 14 | 14 |

AAOT Yellow is an aqueous dispersion which is commercially available from Sun Chemical containing 40 percent by weight pigment under the trade name YHD-7001.
Diansidine Orange is commercially available from Drew Graphics under the tradename OS8088.
Defoamer 2 is a defoaming agent commercially available from Ultra Additives under the tradename PI35-5W.

Example 3

Preparation of Flexographic Magenta Ink Composition

Two magenta ink compositions were prepared by mixing a lithol rubine pigment dispersion, deionized water and a hydrolyzed gelatin binder using conventional mixing apparatus and techniques well known to those of ordinary skill in the art. A control composition was also prepared which used soy protein rather than gelatin as a binder.

The viscosity of the ink compositions was measured using a No. 3 Signature Zahn cup according to ASTM D-4212-93.

| Component | III-1 | III-2 | III-3 |
|---|---|---|---|
| Lithol Rubine 1 | 50.00 | | |
| Lithol Rubine 2 | | 35.00 | 35.00 |
| Gelatin 1 | | 62.10 | 60.00 |
| Soy Protein | 28.80 | | |
| Defoamer 1 | 1.00 | | |
| Surfactant 3 | | 1.00 | 1.00 |
| Monoethanolamine | 0.30 | | |
| Water | 19.90 | 1.90 | 4.00 |
| Total | 100.00 | 100.00 | 100.00 |
| pH | 9.7 | 9.6 | 9.5 |
| Viscosity (seconds) | 11 | 26 | 21 |
| Diluted to Print Viscosity | 11 | 13 | 13 |

Lithol Rubine 1 is an aqueous pigment dispersion containing 33 percent by weight lithol rubine commercially available from Sun Chemical Corporation under the tradename RFD-9587.
Lithol Rubine 2 is an aqueous pigment dispersion containing 22 percent by weight lithol rubine commercially available from Sun Chemical Corporation under the tradename RCD-9572.
Surfactant 3 is a non-ionic surfactant commercially available from Air Products under the tradename Surfynol 420.

Example 4

Preparation of Flexographic Naphthol Red Ink Composition

A naphthol red ink composition was prepared by mixing a rubine shade naphthol pigment dispersion, deionized water and a hydrolyzed gelatin binder using conventional mixing apparatus and techniques well known to those of ordinary skill in the art. A control composition was also prepared which used soy protein rather than gelatin as a binder.

The viscosity of the ink compositions was measured using a No. 3 Signature Zahn cup according to ASTM D-4212-93.

| Component | IV-1 | IV-2 |
|---|---|---|
| Lithol Rubine 1 | 45.00 | |
| Rubine Shade Napthol | | 41.30 |
| Gelatin 2 | | 41.00 |
| Soy Protein | 32.40 | |
| Defoamer 1 | 0.90 | |
| Defoamer 2 | | 0.10 |
| Surfactant 2 | | 1.00 |
| Monoethanolamine | | 0.20 |
| Water | 21.70 | 16.40 |
| Total | 100.00 | 100.00 |
| pH | 9.5 | 9.5 |
| Viscosity (seconds) | 49 | 16 |
| Diluted to Print Viscosity | 14 | 14 |

Rubine Shade Napthol is an aqueous pigment dispersion containing 34 percent by weight rubine shade naphthol commerically available from Sun Chemical Corporation under the tradename RFD-5104.

Example 5

Preparation of Flexographic Cyan Ink Compositions

Three blue ink compositions were prepared by mixing a green shade phthalocyanine blue pigment dispersion, deionized water and a hydrolyzed gelatin binder using conventional mixing apparatus and techniques well known to those of ordinary skill in the art. A control composition was also prepared which used soy protein rather than gelatin as a binder.

The viscosity of the ink compositions was measured using a No. 3 Signature Zahn cup according to ASTN D-4212-93.

| Component | V-1 | V-2 | V-3 | V-4 |
|---|---|---|---|---|
| Green Shade Phthalocyanine Blue pigment dispersion | 34.80 | 34.80 | 34.80 | 34.80 |
| Gelatin 1 | | | 53.10 | 46.50 |
| Gelatin 2 | | 43.20 | | |
| Soy Protein | 50.00 | | | |
| Defoamer 1 | 1.00 | | | |
| Defoamer 2 | | 0.10 | 0.10 | 0.10 |
| Surfactant 4 | 1.00 | | | |
| Water | 13.20 | 21.90 | 12.00 | 18.60 |
| Total | 100.00 | 100.00 | 100.00 | 100.00 |
| pH | 9.7 | 9.9 | 9.6 | 9.7 |
| Viscosity (seconds) | 14 | 11 | 25 | 21 |
| Diluted to Print Viscosity | 14 | 11 | 13 | 14 |

Green Shade Phthalocyanine Blue pigment is an aqueous pigment dispersion containing 50 percent by weight green shade phthalocyanine blue pigment, and is commercially available from Sun Chemical Corporation under the tradename BHD-6000.
Surfactant 4 is a non-ionic surfactant commercially available from Rhone-Poulenc under the tradename Igepal CO977.

Example 6

Various ink compositions containing hydrolyzed gelatin as a binder were prepared and evaluated for various properties using techniques and apparatus well known to those of ordinary skill in the art. Analogous compositions containing soy protein as a binder were also prepared and evaluated as controls.

| | VI-1 | VI-2 | VI-3 | VI-4 | VI-5 | VI-6 |
|---|---|---|---|---|---|---|
| pigment | Black | Black | Yellow | Yellow | Lithol Rubine | Lithol Rubine |
| binder | Gelatin | Soy | Gelatin | Soy | Gelatin | Soy |
| pH | 9.7 | 9.6 | 9.7 | 9.6 | 9.6 | 9.7 |
| wet trap | Better than std. | std. | slightly worse | std. | equal to std. | std. |
| hot block | 0 | 0 | 1 | 5 | 5 | 3 |
| foam | 0 | 60+ | 14 | 60+ | 4 | 4 |
| average mileage | 82.9 | 70.2 | 105.0 | 53.9 | | |
| oven stability | Better | Std. | Better | Std. | Worse | Std. |
| Plate Transfer | Equal | Std. | Better | Std. | Better | Std. |
| Hot Rub | Better | Std. | Slightly Worse | Std. | Equal | Std. |
| Strength | Weaker | Std. | Equal | Std. | Stronger | Std. |

"Wet Trap" is the ability of a printed ink to accept overprinting by a second ink prior to drying of the first ink, and is measured by printing a second ink upon a first ink immediately after the first ink has itself been printed upon a substrate. The degree of coverage of the second ink, any mottling or poor coverage is visually observed.
"Hot block" refers to the heat resistance of a printed ink or coating on a specified substrate under pressure, and is measured by first printing the ink composition onto a substrate and permitting it to dry thoroughly. The substrate is then folded so that two inked surfaces face each other. The folded substate is then inserted into a heat seal machine set at a predetermined temperature and pressure (e.g., 325° F. and 37 psi) for a predetermined time interval. The substrate is then removed, permitted to cool, unfolded, and examined for ink failure. If there is no failure, the procedure is repeated by raising the heat sealer temperature in twenty degree increments until the ink fails by clinging, sticking or picking. The following rating system is employed: 0 - No sticking; 1 - Sticking, less than 1% damage; 2 - 1–15% damage; 3 - 15–70% damage; 4 - greater than 70% damage; 5 - complete failure.

-continued

| | VI-1 | VI-2 | VI-3 | VI-4 | VI-5 | VI-6 |
|---|---|---|---|---|---|---|

"Foam" is determined by measuring the time in seconds required for foam dissipation after a predetermined amount of sample dissolved in water has been vigorously shaken by hand for thirty seconds.

"Average mileage" is the amount of paper a given amount of ink will print, and is evaluated by printing 0.1 ul of ink at printing viscosity onto a substrate using a flexographic handproofer in triplicate. The distance in cm is measured from the beginning of each rollout to the tail, and averaged.

"Oven stability" is used to predict the effect of aging on the ink. The sample is stored in a 118 F. oven for 7 days and removed. It is tested for properties such as viscosity, pH, color, and printability.

"Plate transfer" is the ability of an ink to transfer from the printing plate to the paper substrate to be printed, and is evaluated using a flexographic handproofer, and the roller is rotated 5 times. A plate is inked, placed on the substrate, rolled with a brayer, and the plate is removed. The rollers are rotated twice, the plate is inked, rolled with a brayer, and removed. This procedure is repeated as many times as possible. The greater the number of proofs, the greater the degree of plate transfer.

Hot Rub is evaluated using a Sutherland Rub Tester. The shoe is preheated to 450° F., and a 7" × 2.5" sample is cut from the printed substrate. The sample is placed in the base of the rub tester and secured to prevent movement. The heated block is placed atop the secured sample, the machine is run for 20 back-and-forth cycles, and the sample is visually evaluated for smearing and/or color change at the end of the test.

"Color Strength" refers to the overall visual perception of the color, for example, light or dark and the intensity. It may be described as stronger, weaker, or equal to a standard.

Example 7

Two additional ink compositions containing hydrolyzed gelatin as a binder and either blue pigment or napthol red pigment were prepared and evaluated for various properties using techniques and apparatus well known to those of ordinary skill in the art. Analogous compositions containing soy protein as a binder were also prepared and evaluated as controls.

| | VII-1 | VII-2 | VII-3 | VII-4 |
|---|---|---|---|---|
| Pigment | Blue | Blue | Napthol Red | Napthol Red |
| Binder | Gelatin | Soy | Gelatin | Soy |
| pH | 9.9 | 9.7 | 9.5 | 9.3 |
| Wet trap | Equal | Std. | Better | Std. |
| Hot block | 1 | 5 | 3 | 3.5 |
| Foam | 16 | 60+ | 7 | 3 |
| Average mileage | 95.0 | 50.6 | 77.2 | 47.3 |
| Oven stability | Slightly better | Std. | Worse | Std. |
| Plate transfer | Much Better | Std. | Better | Std. |
| Hot Rub | Equal | Std. | Better | Std. |
| Strength | Slightly weaker | Std. | Stronger | Std. |

Example 8

Preparation of Flexographic Process Extender Compositions

Three process extender compositions were prepared by mixing a hydrolyzed gelatin binder, deionized water and optional additives using conventional mixing apparatus and techniques well known to those of ordinary skill in the art. A control composition was also prepared which used soy protein rather than gelatin as a binder.

The viscosity of the extender compositions was measured using a No. 3 Signature Zahn cup according to ASTM D-4212-93.

| Component | VIII-1 | VIII-2 | VIII-3 | VIII-4 |
|---|---|---|---|---|
| Gelatin 1 | | | 91.00 | 89.00 |
| Gelatin 2 | | 86.90 | | |
| Soy Protein | 84.50 | | | |
| Defoamer 1 | 1.00 | | | |
| Defoamer 2 | | 0.10 | | |
| Surfactant 1 | 1.00 | | | |
| Glycerine | 7.00 | | | |
| Water | 6.50 | 13.00 | 9.00 | 11.00 |
| Total | 100.00 | 100.00 | 100.00 | 100.00 |
| PH | 9.3–9.7 | 9.7 | 9.9 | 9.8 |
| Viscosity (seconds) | 20–26 | 20 | 28 | 21 |

What is claimed is:

1. A flexographic preprint ink composition, comprising:
   a. at least 3 weight percent of a pigment;
   b. at least 15 weight percent of a hydrolyzed gelatin binder; and;
   c. water.

2. The ink composition of claim 1, wherein said pigment is selected from the group consisting of diarylide yellow, orange, napthol red, lithol rubine, phthalocyanine green, phthalocyanine blue, barium lithol, calcium lithol, rhodamine, violet, alkali blue, titanium dioxide or carbon black.

3. The ink composition of claim 2, wherein said pigment is selected from the group consisting of a yellow, green shade phthalocyanine blue, diansidine orange, carbon black, rubine shade napthol red or lithol rubine pigment.

4. The ink composition of claim 1, wherein said hydrolyzed gelatin is obtained from a source selected from the group consisting of cow, fish, bone or pig.

5. The ink composition of claim 4, wherein said source is cow.

6. The ink composition of claim 1, wherein said hydrolyzed gelatin has an average molecular weight of 1500 to 2500.

7. The ink composition of claim 1, further comprising an amine as a pH adjusting agent.

8. The ink composition of claim 1, having a pH of from 9.0 to 10.0.

9. The ink composition of claim 1, further comprising a defoamer.

10. The ink composition of claim 1, wherein a viscosity of said composition is at least 11 seconds, as measured in a No. 3 Signature Zahn cup.

11. The ink composition of claim 10, wherein said viscosity ranges from 11 to 25 seconds.

12. The ink composition of claim 1, wherein said pigment is present in an amount of from 8 to 25 weight percent.

13. The ink composition of claim 1, wherein said gelatin is present in an amount of from 15 to 40 weight percent.

14. The ink composition of claim 1 further comprising a glycol.

* * * * *

UNITED STATES PATENT AND TRADEMARK OFFICE
CERTIFICATE OF CORRECTION

PATENT NO. : 6,669,769 B2
DATED : December 30, 2003
INVENTOR(S) : Doreen E. Smith It is certified that error appears in the above-identified patent and that said Letters Patent is hereby corrected as shown below:

Column 4,
Line 50, Detailed Description of the Preferred Embodiments, "Diluted to Print Viscosity 15  14  14  14" should read -- Diluted to Print Viscosity 15  14  14  13 --.

Column 7,
Lines 1 to 4, reading

- continued

| VI-1 | VI-2 | VI-3 | VI-4 | VI-5 | VI-6 |
|------|------|------|------|------|------| should be deleted
Line 12, "a 118 F. oven" should read -- a 118° F. oven --.

Signed and Sealed this

Tenth Day of August, 2004

JON W. DUDAS
*Acting Director of the United States Patent and Trademark Office*